April 9, 1946.  A. CHILTON  2,398,207
TORSION VALVE SPRING
Filed April 12, 1943  3 Sheets-Sheet 1

INVENTOR
ALLAN CHILTON.
BY
ATTORNEY

April 9, 1946.  A. CHILTON  2,398,207
TORSION VALVE SPRING
Filed April 12, 1943  3 Sheets-Sheet 2
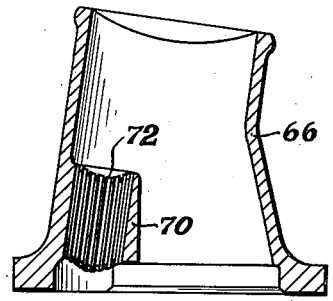
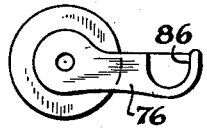
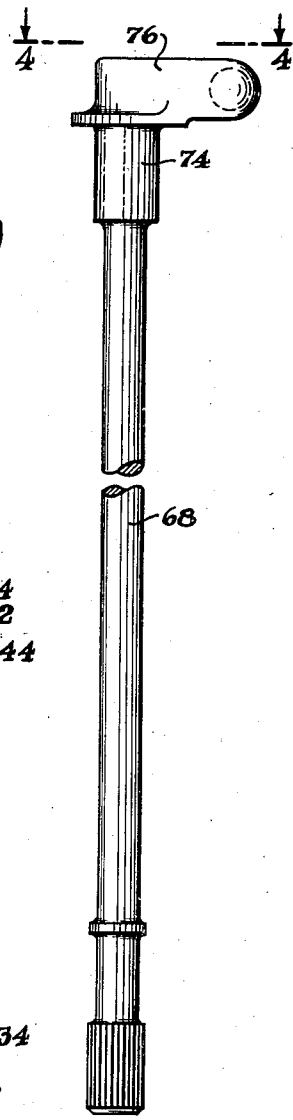
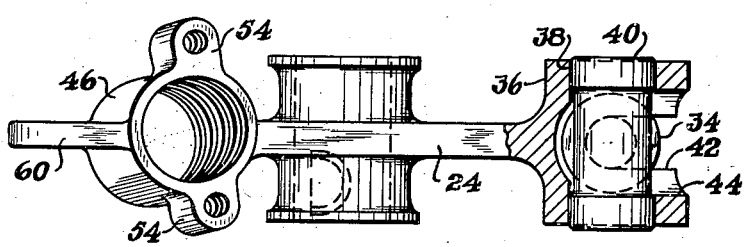
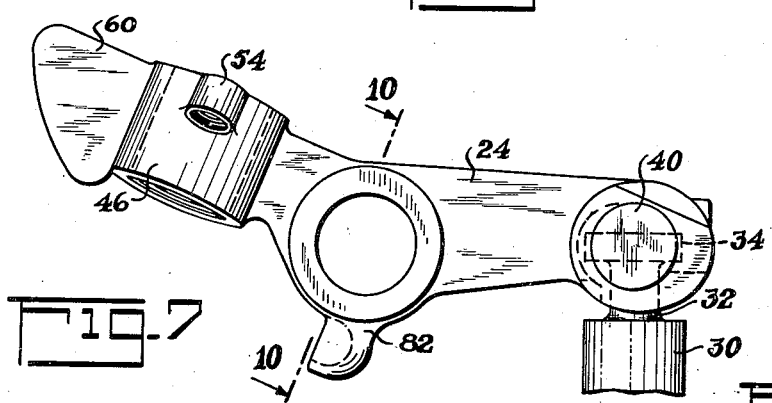
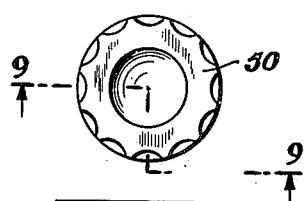
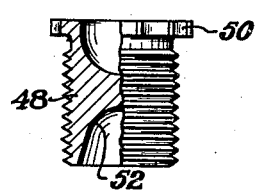
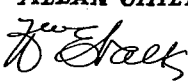
INVENTOR
ALLAN CHILTON.
BY
ATTORNEY April 9, 1946.	A. CHILTON	2,398,207
TORSION VALVE SPRING
Filed April 12, 1943	3 Sheets-Sheet 3
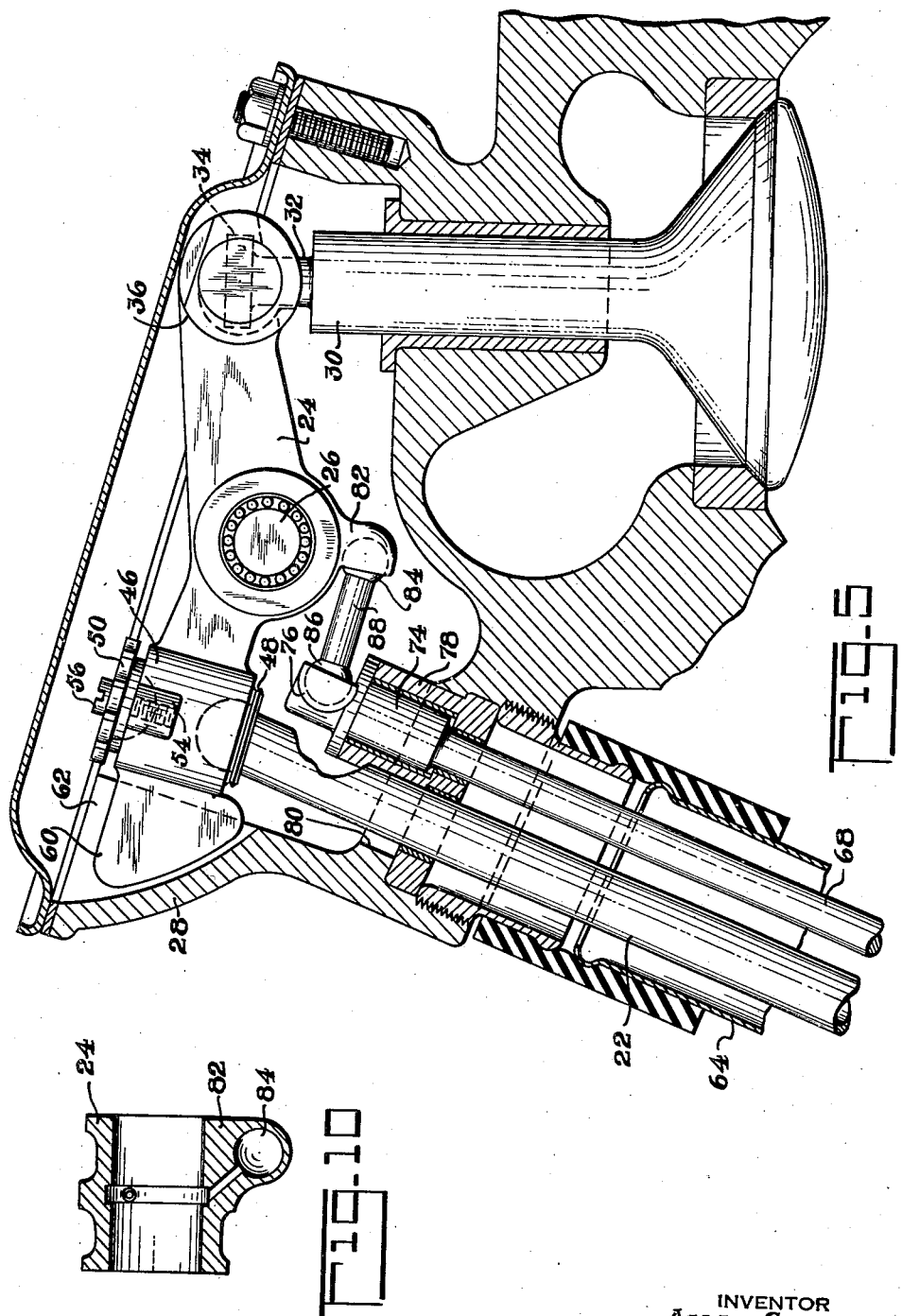
INVENTOR
ALLAN CHILTON.
BY
ATTORNEY Patented Apr. 9, 1946

2,398,207

UNITED STATES PATENT OFFICE 2,398,207

TORSION VALVE SPRING

Allan Chilton, Ridgewood, N. J., assignor to Wright Aeronautical Corporation, a corporation of New York Application April 12, 1943, Serial No. 482,789

6 Claims. (Cl. 123—90)

This invention relates to valve operating mechanisms and is particularly directed to such a mechanism in which a torsion rod is substituted for the conventional helical-type valve springs.

In the conventional practice a plurality of helical valve springs are disposed about the valve to bias the valve to its closed position. This disposition of the valve spring adds to the overall height of the engine, a result which is particularly undesirable in aircraft engines. Accordingly, it is an object of this invention to so dispose the valve spring that the valve gear occupies less length axially of the associated cylinder than the arrangements heretofore used. It is a further object of this invention to use a torsion rod-type valve spring since such a valve spring has less surge inertia than the helical type valve springs. It is a further object of this invention to provide a highly compact valve gear assembly in which a single tubular casing encloses the valve operating push rod and the torsion rod valve spring.

Other objects of this invention will become apparent in reading the annexed detailed description in connection with the drawings, in which:

Fig. 2 is an enlarged sectional view of a detailed portion of Fig. 1;

Fig. 3 is a plan view of the torsion rod valve spring;

Fig. 4 is a view along the line 4—4 of Fig. 3;

Fig. 5 is a sectional view through the rocker box;

Fig. 6 is a top view partly in section of the rocker arm;

Fig. 7 is a side view of the rocker arm;

Figs. 8 and 9 are detailed views of the push rod bearing seat; and

Fig. 10 is a section on the line 10—10 of Fig. 7.

Figure 1:
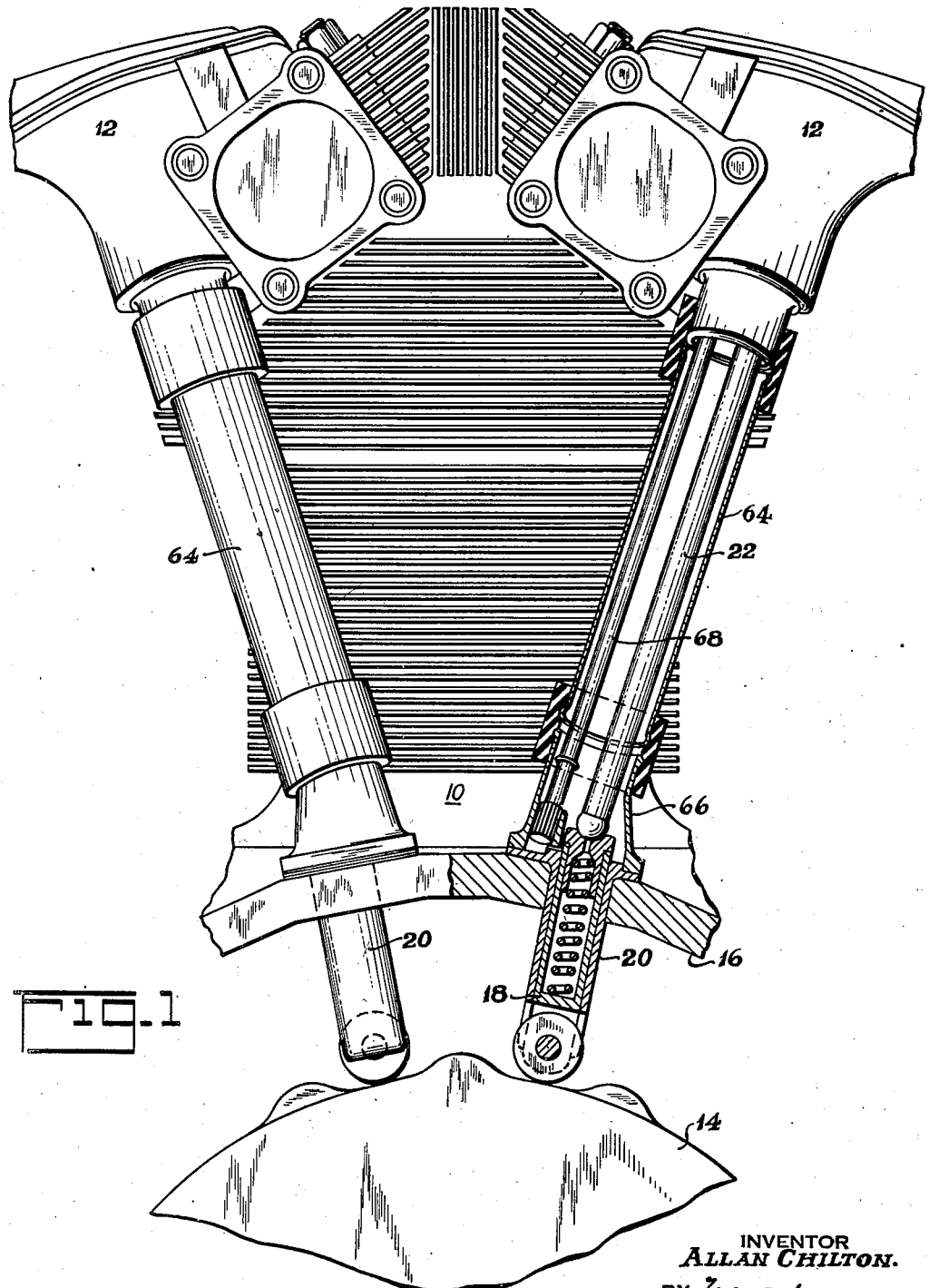
Fig. 1 is a partial sectional view illustrating the invention.

Referring to the drawings, a cylinder 10 of an air-cooled radial cylinder aircraft engine is provided with the usual intake and exhaust valve rocker boxes 12. An engine driven cam 14 mounted within the crankcase 16 is adapted to actuate the valve tappets 18 mounted in the tappet guides 20 which in turn are secured to and extend into the crankcase. A push rod 22 is disposed between each valve tappet and a rocker arm 24 pivotally mounted about a rocker arm bolt 26 within the rocker box 12. A push-pull connection is provided between a valve stem 30 and one end of the rocker arm. This push-pull connection may be similar to that disclosed in the co-pending application of Roland Chilton, Serial No. 418,649, or any conventional push-pull connection may be used.

The upper end of the valve stem is provided with an annular groove 32 to define a head portion 34 while one end of the rocker arm is provided with a boss 36 having a cross bore 38. A trunnion 40 is journaled in the cross bore and this trunnion is provided with a T-shaped slot for the reception of the neck and head portion of the valve stem. The lower side of the rocker arm boss 36 is bifurcated at 42 and reeved at 44 to permit passage of the head portion of the valve stem. A push-pull connection is thereby provided between the rocker arm and valve stem.

The other end of the rocker arm is provided with a boss 46 having a threaded bore for the reception of a bearing element 48. The bearing element 48 is provided with a scalloped head 50 at one end and a push rod bearing seat 52 at its other end. The rocker arm boss 46 is provided with a pair of unsymmetrically disposed ears 54 each adapted to receive a screw or bolt 56 for cooperation with the scalloped head 50 to lock the bearing element in a desired position of adjustment. The ears 54 are so disposed that when one of the ears is in alignment with a scallop on the head 50, the other ear is disposed midway between a pair of scallops. In this way it is possible to adjust the bearing element in increments equal to one-half the arc subtended by each scallop. This end of the rocker arm is also provided with a thrust flange 60 which is adapted to be received within a channel 62 formed in the rocker box. This thrust flange thereby absorbs any side thrust imposed upon the rocker arm as a result of the angularity of the push rod relative to the rocker arm.

The push rod 22 as usual is enclosed in a tubular housing 64 secured at one end to the rocker box and at the other end to a boot-like element 66 secured to the crankcase over the associated valve tappet. A torsion rod 68 is provided for biasing the associated valve in a closing direction and this torsion rod is also enclosed within the push rod housing 64. The lower end of the torsion rod is anchored to the crankcase through the boot-like element 66. For this purpose the boot-like element is provided with a boss 70 having internal splines 72 adapted to receive a splined end of the torsion rod 68. The other end of the torsion rod is provided with an enlarged bearing surface 74 and a transversely extending arm 76. The rocker arm is provided with a downwardly extending arm 82 and both this extension and the transverse extension 76 on the torsion rod are provided with spherical seats 84 and 86 respectively for the reception of an interposed dumbbell-like member 88. Also, both the push rod 22 and the torsion rod 68 are received within a bearing collar 78 disposed about the rocker box opening 80.

With the above construction actuation of the push rod by the engine driven cam 14 rotates the rocker arm to open the valve and at the same time this rotation of the rocker arm is effective through the depending arm 82, dumbbell arm 88, and transverse extension 76 to twist and torsionally stress the rod 68. That is, the torsion rod 68 is so stressed or twisted about its longitudinal axis that it biases the valve stem in a valve closing direction. The torsion rod 68 may be initially torsionally strained at assembly to provide the necessary valve biasing force. The side by side disposition of the push rod and valve stem within a single tubular casing results in a very compact arrangement. Also, the disposition of the torsion rod alongside the push rod with one end of the torsion rod anchored adjacent the base of the associated cylinder provides for the use of a substantially long torsion rod which does not add to the overall height of the engine. A further advantage of applicant's construction over the conventional helical-type valve springs is that in operation the helical type valve spring not only has a torsional strain but it also has a large linear movement and therefore has considerably more surge inertia than the torsion rod type spring herein disclosed.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination with an engine, a crankcase therefor, a cylinder mounted on said crankcase and having a valve and rocker box into which the valve stem projects, a valve operating push rod extending from said crankcase into said rocker box, said push rod being operatively connected to said valve stem, a torsion rod disposed alongside said push rod, one end of said torsion rod being anchored adjacent the crankcase and its other end extending into said rocker box and being operatively connected to said valve stem for urging said valve in a closing direction, and a common tubular housing for said push rod and torsion rod extending from said crankcase to said rocker box.

2. In combination with an engine, a crankcase therefor, a cylinder mounted on said crankcase and having a valve and rocker box into which the valve stem projects, a valve operating push rod extending from said crankcase into said rocker box, said push rod being operatively connected to said valve stem, a torsion rod disposed alongside said push rod and operative to bias said valve in a closing direction, and a common tubular housing for said push rod and torsion rod extending from said crankcase to said rocker box.

3. In combination with an engine, a crankcase therefor, a cylinder mounted on said crankcase and having a valve and rocker box into which the valve stem projects, a valve operating push rod extending from said crankcase into said rocker box, said push rod being operatively connected to said valve stem, and a torsion rod disposed alongside said push rod, one end of said torsion rod being anchored adjacent the crankcase and its other end extending into said rocker box and being operative to urge said valve in a closing direction.

4. In combination with an engine, a crankcase therefor, a cylinder mounted on said crankcase and having a valve and rocker box into which the valve stem projects, a valve operating push rod extending from said crankcase into said rocker box, a rocker arm within said box having opposed arms in operative engagement with said valve stem and push rod respectively, a torsion rod disposed alongside said push rod, one end of said torsion rod being anchored adjacent the crankcase and its other end extending into said rocker box and being operatively connected to said rocker arm for urging said valve in a closing direction, and a common tubular housing for said push rod and torsion rod and extending from said crankcase to said rocker box.

5. In combination with an engine, a crankcase therefor, a cylinder mounted on said crankcase, a valve for said cylinder, a valve-operating member extending from said crankcase with its end remote from said crankcase operatively connected to said valve, and a torsion rod disposed alongside of and substantially parallel to said member, one end of said torsion rod being anchored adjacent said crankcase and its other end being operatively connected to said valve in such a manner that the torsional elasticity of said rod urges said valve in a closing direction.

6. In combination with an engine, a crankcase therefor, a cylinder mounted on said crankcase, a valve for said cylinder, a valve-operating member extending from said crankcase with its end remote from said crankcase operatively connected to said valve, a torsion rod disposed alongside of and substantially parallel to said member, one end of said torsion rod being anchored adjacent said crankcase and its other end being operatively connected to said valve in such a manner that the torsional elasticity of said rod urges said valve in a closing direction, and a common housing for said member and rod.

ALLAN CHILTON.